Figure 8:
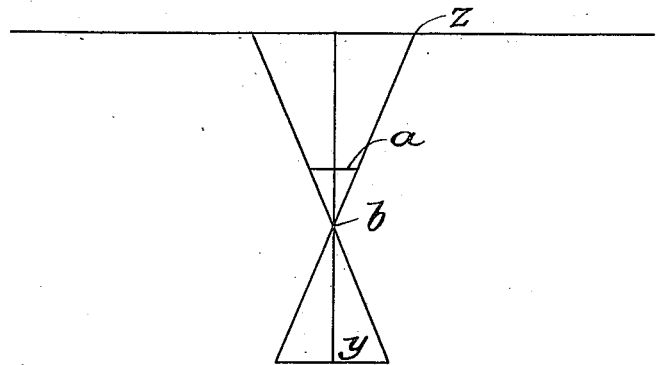

F. W. DUFWA.
DEVICE FOR MAINTAINING THE EQUILIBRIUM OF FLYING MACHINES.
APPLICATION FILED AUG. 12, 1908.
1,065,033.
Patented June 17, 1913.
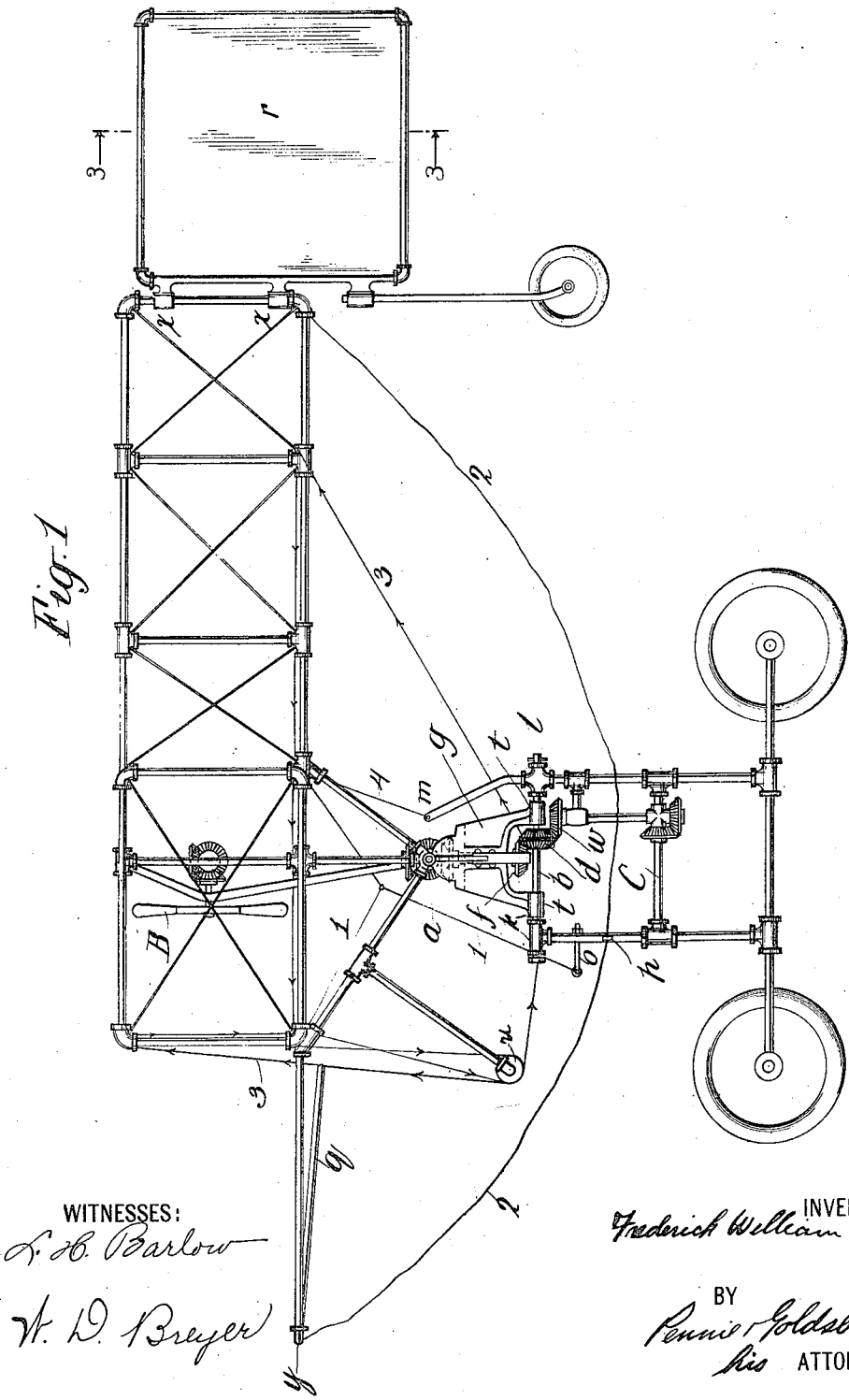
WITNESSES:
INVENTOR
BY
ATTORNEYS

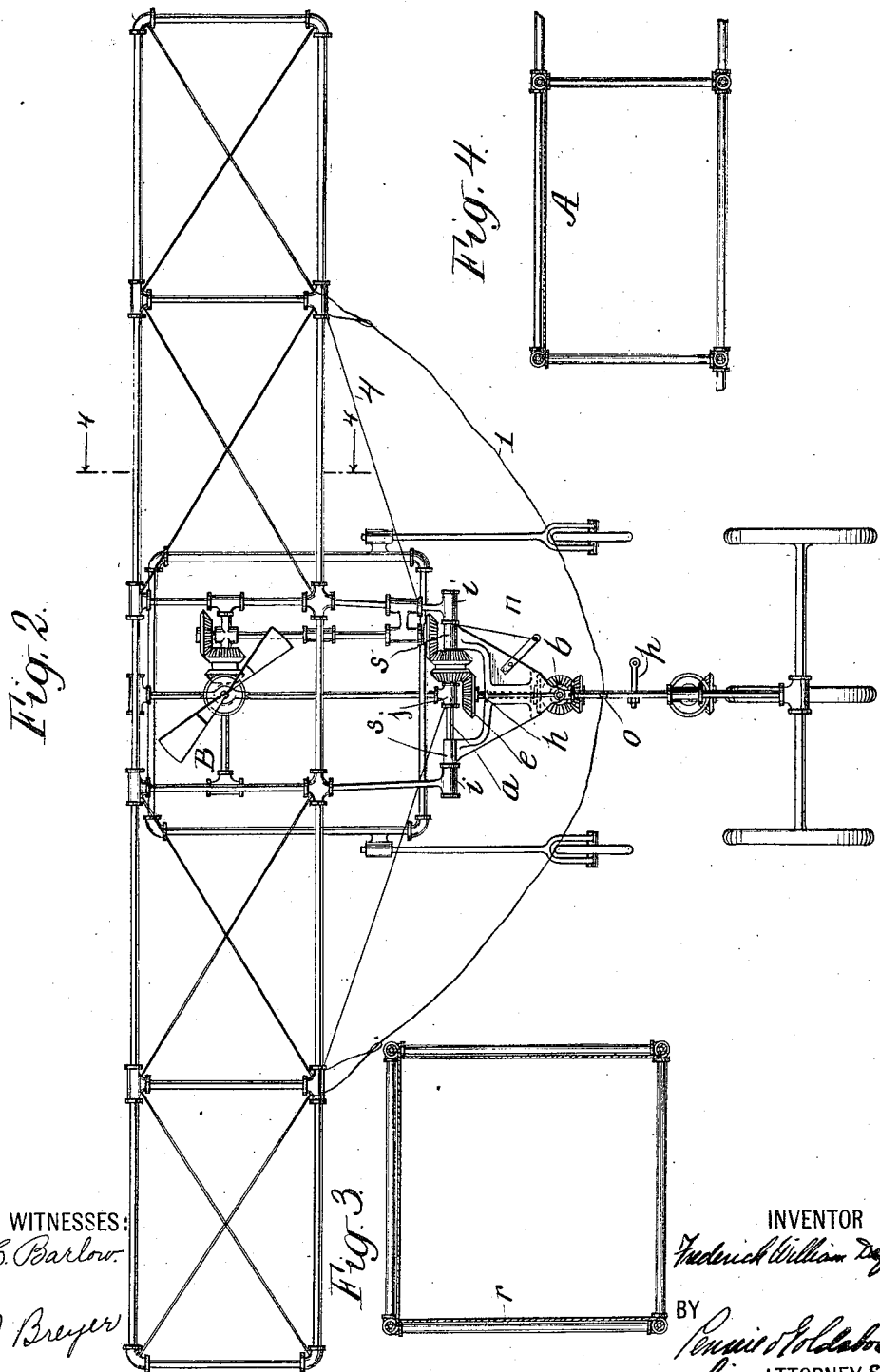

F. W. DUFWA.
DEVICE FOR MAINTAINING THE EQUILIBRIUM OF FLYING MACHINES.
APPLICATION FILED AUG. 12, 1908.
1,065,033.
Patented June 17, 1913.
4 SHEETS—SHEET 3.
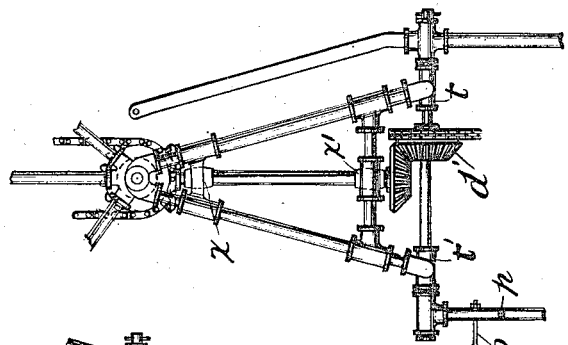
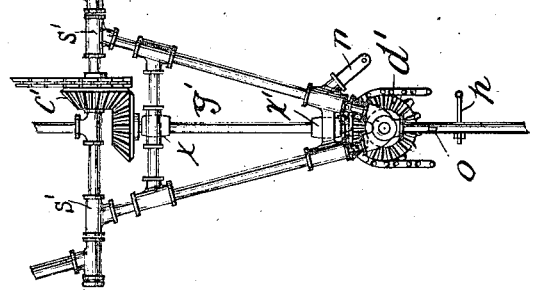
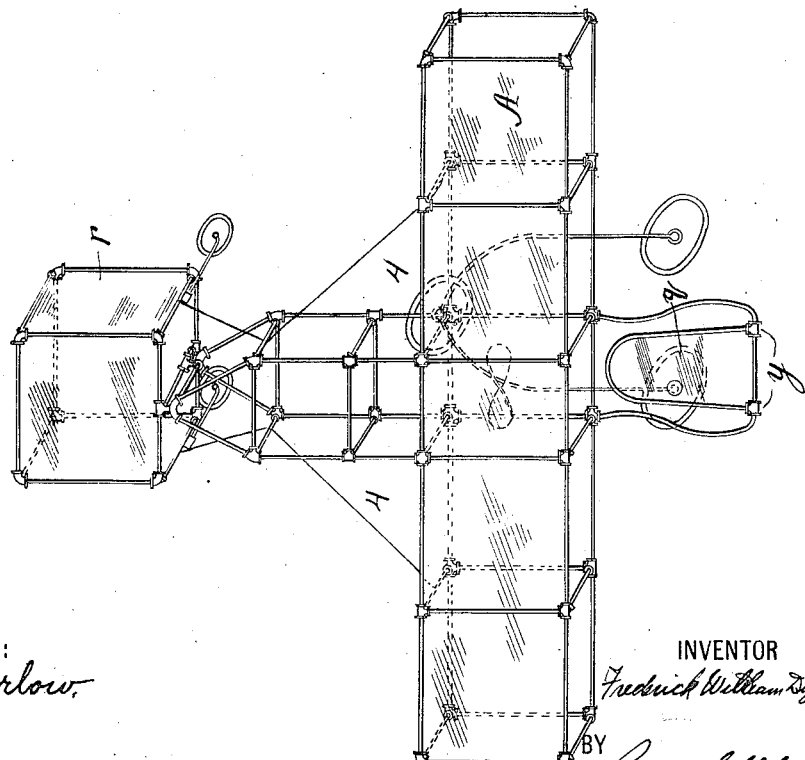
WITNESSES:
L. H. Barlow.
W. D. Breyer
INVENTOR
Frederick William Dufwa
BY
Pennie & Goldsborough
his ATTORNEYS F. W. DUFWA.
DEVICE FOR MAINTAINING THE EQUILIBRIUM OF FLYING MACHINES.
APPLICATION FILED AUG. 12, 1908.

Patented June 17, 1913.

Witnesses.

Inventor.
Frederick W. Dufwa.

UNITED STATES PATENT OFFICE.

FREDERICK WILLIAM DUFWA, OF MEXICO, MEXICO.

DEVICE FOR MAINTAINING THE EQUILIBRIUM OF FLYING-MACHINES.

1,065,033.    Specification of Letters Patent.    Patented June 17, 1913.

Application filed August 12, 1908. Serial No. 448,258.

*To all whom it may concern:*

Be it known that I, FREDERICK WILLIAM DUFWA, a citizen of Sweden, residing at 1040 Calle Tolsa, city of Mexico, Mexican Republic, have invented certain new and useful Improvements in Devices for Maintaining the Equilibrium of Flying-Machines, of which the following is a specification.

My invention relates to certain new and useful improvements in flying machines and has for its object first; to establish the equilibrium of a machine while in the air; secondly; to automatically maintain or reëstablish such equilibrium, if disturbed; and thirdly, to permit the operator of the machine to make use of the automatic apparatus, at will, for the purpose of steering the machine.

In the accompanying drawings, Figure 1 represents a side elevation or fore and aft view of a flying machine embodying my improvements; Fig. 2 represents an end elevation thereof; Figs. 3 and 4 represent respectively sectional views on the lines 3—3 and 4—4; Fig. 5 represents a perspective view of the general frame-work of the flying machine; Figs. 6 and 7 represent views taken at right angles to each other of a modified form of the car suspending devices and the mechanism which they support; and Figs. 8 to 13 are diagrammatic views of the machine in the act of flying, Figs. 10 and 12 being taken from the front and Figs. 9, 11 and 13 showing the machine as it appears from the side.

Similar letters of reference indicate similar parts throughout the several views.

In order to sustain and propel a flying machine through the air, it is necessary that it be provided with wings or planes, either movable or immovable and that it be supplied with rudders fore and aft of the machine for giving it direction horizontally and vertically, and that it be provided with a power driven or manually operated motor so as to give the necessary impulse to the wings or the driving propellers for advancing it on its course. Accordingly, in illustrating my invention, I have, for purposes of illustration, shown the flying machine as provided with these generic features, but without intending thereby to limit myself to the particular kind of wings or driving mechanism, or the particular kind of fore and aft rudders employed for giving direction to the machine.

The general arrangement of a machine appropriate to the uses of my invention is indicated, in one of its convenient embodiments, in Fig. 5 of the drawings, wherein A indicates the supporting aeroplane of the machine, $r$ the horizontally swinging rudder and $q$ the vertically swinging rudder. When the machine is pursuing a course of rectilinear flight, the rudder $r$ is parallel to the balancing main body portion A, and the rudder $q$ is in a horizontal plane. An alteration of the course of the machine in a horizontal direction is incident to the shifting of the rudder $r$ upon its supporting hinges $x$ to the right or left, as the case may be, and an alteration of the course of the machine in a vertical direction is incident to the shifting of the rudder $q$ vertically upon its hinge supports $y$; as will be readily understood.

The main characteristic feature of my invention consists in automatically maintaining the machine in its position of normal equilibrium, by means of the hanger upon which the car is supported. To this end, I provide means for suspending the car from the main body portion of the flying machine, in such manner that it will hang freely therefrom, maintaining a vertical position whatever momentary change may take place in the dip or inclination of the main body portion itself whether in a horizontal or vertical direction, and I connect the freely suspended car to the fore and aft rudders in such manner that a momentary change in the rectilinear flight of the machine occasioning either a horizontal or a vertical dip or inclination of its main body portion will be immediately corrected from the car body by a corresponding shifting of the vertically swinging or horizontally swinging rudder, or both, as the case may be. So far as I am aware, this is broadly new in the art of aero-navigation, and I, therefore, desire that my generic claims be interpreted accordingly.

In putting my invention into practice, I may employ as the freely swinging hanger for the carrier or car any suitable hanger supported from the main body portion of the machine by a universal joint, in the sense of a joint having the capacity to permit the car to swing freely in directions at right angles to each other. One form of modification of hanger for this purpose is illustrated in Figs. 1 and 2, and, as therein shown, consists of a casting $g$ provided at its upper part with the collars $s$ which are adapted to swing freely in a fore and aft direction upon the fixed shaft $a$, which, passing through the collars $s$ is supported in a central collar $j$ and outer collars $i$ connected with and forming a part of the rigid frame work of the machine. At the lower portion of the casting $g$ is supported a similar fixed shaft $b$ which passes through the collars $t$; and, outside of the collars $t$ are located the swinging sleeves $k$ and $l$ which support the car or carriage whose frame is indicated as provided with supporting wheels, for facilitating the starting and alighting of the machine. It will be apparent that by means of this double suspension of the car or carrier from the fixed shaft $a$ and the fixed shaft $b$, it may swing both fore and aft and in a sidewise direction, so that, whatever the position which the main body portion of the machine may momentarily assume, the car or carrier will remain vertically suspended. This vertical suspension of the car or carrier is attained in the construction illustrated in Figs. 6 and 7, in a manner altogether similar. In this modification, there is employed, instead of the casting $g$, a hanger $g'$, which is made up of stout tubing connected by appropriate cross spiders, and having collars $s'$ corresponding in position and function to the collars $s$ of Figs. 1 and 2, and being likewise provided with collars $t'$ corresponding in position and function to the collars $t$ of Figs. 1 and 2.

The propeller B conventionally illustrated, may be conveniently geared to a motor shaft, as, for instance, C, mounted upon the car or carrier. To this end, there is mounted upon the stationary shaft $a$ an idle gear consisting, in the form shown in Figs. 1 and 2, of a double miter gear, $c$, and, in the form shown in Figs. 6 and 7, of a combined miter and band or sprocket gear $c'$. So also, the stationary shaft $b$ is provided, in the form shown in Figs 1 and 2, with a double miter gear $d$ and in the form shown in Figs. 6 and 7, with a combined miter and band or sprocket gear $d'$. In either of them, the gear $c$ or $c'$ is geared by intermediate elements with the shaft of the propeller B and the gear $d$ or $d'$ is connected, by intermediate transmission elements, to the power shaft C. The gears $c$ and $d$, or $c'$ and $d'$, as the case may be, are connected by the miter gears $e$ and $f$ fixed to opposite ends of the shaft $h$. It will be apparent that whatever may be the swing of the elements of the hanger, the transmission from the motor shaft C to the propeller B will not be interrupted.

The upper shaft $a$, as will be noted, is arranged in a line parallel to the center line of the wings. It may, however, be placed in any other appropriate position, corresponding to its intended function and by making corresponding changes in the connections, hereinafter described, which automatically move the rudder.

The distance below the wings, at which the upper shaft $a$ of the hanger should be suspended by its stiff supports, depends on the following factors: the size of the wings, the weight of the car and its contents, and the air pressure that is to be resisted. The stiff supports of the shaft $a$, rigidly united to the frame of the wings, serve as a lever for the action of gravity, which works by means of the weight of the car and its contents to resist automatically any inclination of the wings. We will therefore call the distance of the shaft $a$ from the wings: the leverage distance. The longer this leverage distance is, the steadier will be the flight of the flying-machine, but it will also be more difficult to change its course upward or downward, because the more the machine dips the stronger is the resistance of gravity. The length of the leverage distance also depends on the exact position of the shaft $a$ in relation to the wings, which can vary from a point exactly below the center of gravity of the wings to a point some distance in front of this. The shortest leverage distance is obtained by fixing the shaft $a$ exactly below the center of air pressure, but as this must vary with the speed of the machine in relation to the surrounding air, an approximate middle position should be the best one. What has been said of the leverage distance of the shaft $a$ from the wings, also has its application to the shaft $b$, whose leverage distance should be calculated so that it will automatically preserve the lateral equilibrium of the flying-machine, or not permit its wings to dip too far sidewise. The advantages of the two pivot joint over a single universal joint are thus: first, that as the dimensions of the wings of a flying-machine generally are longer sidewise than in a fore and aft direction, so the leverage distances can be correspondingly calculated; second, the two pivot joint will allow of an efficient transmission, such as described, between the motor in the car and the propeller on the upper body portion; and third, connections can be made by means of cords or wires between the hanger and the horizontal rudder and between the car frame and the vertical rudder so that the sidewise swing of the car will not affect the former connection, nor will the fore and aft swing of the hanger appreciably affect the latter. By means of these connections, which automatically transfer the movements of the hanger and car to the rudders, the leverage distances can be made shorter, and thus also the hanger shorter.

The connections, by means of which the rudders are automatically moved to reëstablish the conditions of equilibrium whenever the wings, in flying, alter their position with respect to the car, consist of the endless cords or wires 3 and 4, leading respectively to the front rudder $q$ and the rear rudder $r$. The endless cord or wire 3 is connected to the hanger $g$ or $g'$ in any suitable manner, as for instance by means of the projection $n$ shown in Figs. 2 and 6. From this projection the endless cord is stretched forward and backward and passes over suitable blocks or sheaves placed at appropriate locations according to the construction of the flying machine. This cord 3 is connected to the front rudder $q$ in such manner as to normally keep the machine in a horizontal position for direct forward flight, or at any suitable angle to the horizontal if it is desired to rise or descend. Accordingly, the endless cord or wire 3 passes above and below the place where it is fixed to the back edge of the rudder $q$ so that a descending movement of the front part of the machine causes the cord or wire 3 to move in such manner as to lower the rear end of the rudder $q$. So also, as the front part of the machine ascends, the endless cord or wire 3 moves the rear end of the rudder $q$ upward. It will be apparent therefore that the ascent or descent of either the front or the rear ends of the machine is accompanied by a counteracting movement of the front rudder $q$ automatically applied by the endless cord or wire 3 from the hanger $g$ or $g'$ to counteract such movement.

The endless cord or wire 4 which controls the rear rudder $r$, is attached to an arm $m$ connected to a suitable part of the swinging car frame, as, for instance, to either of the collars $k$ or $l$. The arm $m$ is preferably bent inward in such manner that its upper end or point of attachment for the cord or wire 4 will approach the transverse shaft $a$ as closely as the gear $c$ will permit, so that the cord 4 will be substantially unaffected by the deflection of the aeroplane from the horizontal. The cord or wire 4 is fastened to this upper end of the arm $m$ and the cord or wire is carried along the frame work of the flying machine, over blocks and pulleys, situated in suitable positions as may be required by the particular construction of the frame work. The connection of the cord or wire 4 with the arm $m$ is made intermediate of the length of the cord or wire, and the end portions of the latter are then carried outward over blocks located in suitable positions about the middle of the wings at each side, as shown in Fig. 2, said portions then being carried to the rudder $r$ and fastened to it at opposite sides of its hinge connection, as shown in Fig. 4. In this manner the lateral movement of the arm $m$ relatively to the frame of the machine, caused by a dip toward the right or left, will produce a pull on the cord 4 at one side or the other. Thus, when the cord or wire 4 is secured in place and well stretched, the ascent or descent (i. e., the side dip to the right or left) of the wings or main body portion of the flying machine will have the effect of giving to the rudder $r$ a counteracting swing, thereby reëstablishing the former conditions of equilibrium.

The ascent of the wings on one side of the machine will pull the rudder over to the other side, making the whole machine change the direction of its flight to the side of the lower wing. This will make the raised wing swing away from the current that raised it, and the wings will then gradually return to a horizontal position on account of the pull exercised by the car, which also will swing outward by the action of the centrifugal power on it. This will somewhat equalize the air pressure on the wings and prevent their slipping down the inclined plane they form.

From the above, it will be understood that the length of the element $g$ must be calculated in such manner that the rudders will have sufficient play whenever one or the other side of the flying machine is lifted by the wind, if it is desired to use these automatic connections. In order to place the automatic devices at the service of the operator, so that he may steer the machine, a cord 1 is loosely hung from one wing to the other, this cord passing through an aperture in the end of a projection $o$ connected to a portion of the swinging car frame. By pulling upon this rope the flying machine can be caused to turn in the direction of the side of the wing which has been thus pulled down or dipped. In like manner, a cord 2 is hung loosely from the forward to the aft part of the upper framework of the flying machine, passing through an aperture in the arm or projection $p$ in the car. By pulling upon the cord 2 the level of the upper framework of the machine is momentarily changed, the machine receiving an upward or a downward inclination corresponding to the direction of pull on the cord. Any permanent alteration in the course, however, must be prepared for by first changing the position of the front rudder $q$ so as to permit such alteration. By exerting a pull upon the cords 1 and 2 so as to stretch them tightly, they will give rigidity to the apparatus when it is on the ground or when it is about to alight at the end of its flight.

Figure 9:
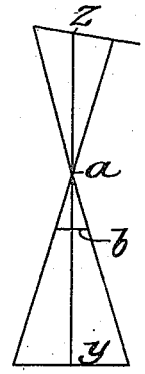
Figure 10:
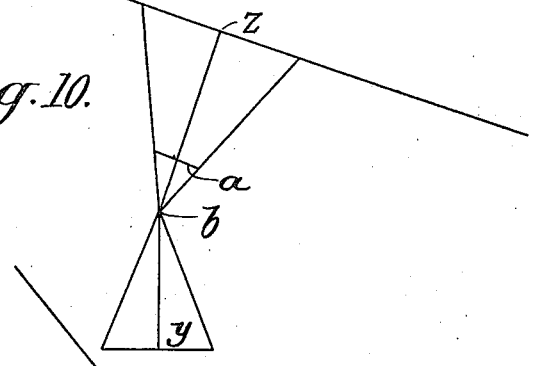
Figure 11:
Figure 12:
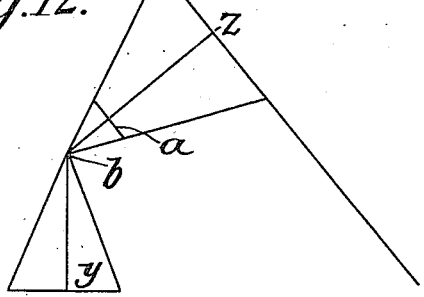
Figure 13:

Figs. 8 to 13 illustrate different positions which the machine may assume in its flight through the air. Figs. 8, 10 and 12 show the machine from the front with the lifting surface z tilted laterally at different inclinations to the horizontal, and Figs. 9, 11 and 13 show the lifting surface (formed by the wings), inclined with respect to the longitudinal axis of the machine, whereby an upward or downward movement in the direction of flight is obtained. These views show the different positions which the shafts a and b assume, and it also appears how the car, which is designated by reference character y, acts by gravity to maintain the equilibrium of the machine.

It will, of course, be understood that in constructing the different parts of the apparatus, materials most suitable thereto are to be employed with the particular purpose of combining strength with lightness, and that the several parts, having mechanical functions, such as the gears and the like, should be made as small as possible with due regard to the purposes for which they are severally intended. So also, wherever it is desirable to employ ball bearings, as, for instance, in all the sliding collars or in the revolving gears, such ball bearings may be employed to advantage. These are considerations addressing themselves to the intelligence of the skilled mechanic and are to be taken into consideration in calculating the strength and dimensions of the material required, in view of the particular conditions of use and the general type of the flying machine to which the improvements are applied.

Having thus described my invention, what I claim is:—

1. In a flying machine, provided with a rudder mounted to swing sidewise, and a swinging car, a flexible connection between the swinging car and the rudder, whereby a side dip or inclination of the machine will automatically swing the rudder, so as to reestablish the equilibrium; substantially as described.

2. In a flying machine, the combination of a main body portion, a car suspended freely therefrom, a vertically swinging rudder, a horizontally swinging rudder, and automatically operated connections between both of said rudders and the car by which the former are actuated to maintain the equilibrium of the body portion in both a vertical and a horizontal plane; substantially as described.

3. In a flying machine, the combination with the lifting surfaces, of a balancing mechanism consisting of a depending hanger, an upper axle supporting the balancing mechanism, a lower axle at right-angles to the upper axle, a car having rigidly supported bearings suspended from the lower axle, and bearings rigidly supported from the hanger for the upper and lower axles; substantially as described.

4. In a flying machine, the combination with the main body portion, of a rigid fore and aft swinging hanger supported rigidly therefrom, a sidewise swinging car or carrier frame supported from the hanger and having an upwardly directed arm, the upper end of which comes close to the upper axle of the hanger, a vertical rudder for directing the horizontal course of the flying-machine, and connections by means of cords or wires and blocks or sheaves from said rudder to the upper end of the arm on the car frame, so that a side dip or inclination of the flying-machine will automatically swing the rudder over to the lower wing; substantially as described.

5. In a flying machine, the combination with the main body portion, of a fore and aft swinging hanger supported therefrom, a sidewise swinging car or carrier frame supported on the hanger, fore and aft rudders respectively, for directing the course of the car both laterally and vertically, and connections from said rudders to the swinging hanger and swinging car frame for automatically reëstablishing equilibrium of the machine; substantially as described.

6. In a flying machine, a suspending device for the car or carrier, consisting of a lower shaft extending in a fore and aft direction and from which the car frame is suspended, an upper shaft extending in a direction transverse to the lower one and an intermediate hanger, supporting the lower shaft and swinging fore and aft upon the upper shaft; substantially as described.

7. In a flying machine, the combination with the main body portion, of a hanger adapted to swing fore and aft with respect thereto, a car adapted to swing in a direction transverse to the swing of the hanger and suspended from said hanger, a propeller carried by the frame of the machine, and gearing actuated from the car and extending between the car and the propeller; substantially as described.

8. In a flying machine, the combination with the lifting surfaces thereof, of rudders for directing the machine vertically and horizontally, a car suspended from the main body portion by a universal joint located below the lifting surface and rigidly supported therefrom, and stretched connections extending from the rudders to the universal joint hangings of the car; substantially as described.

9. In a flying machine, a car hanger consisting of an upper stationary shaft, a frame mounted to swing fore and aft upon said shaft, a lower shaft connected to said swinging frame, and a transversely swinging car supported from the lower shaft; substantially as described.

10. In a flying machine, a car hanger consisting of an upper stationary shaft, a frame mounted to swing fore and aft upon said shaft, a lower shaft connected to said swinging frame, a transversely swinging car supported from the lower shaft, motor gearing on the car, propeller gearing on the main frame of the machine and intermediate gearing mounted upon the hanger and its rigid shafts; substantially as described.

11. In a flying machine, an upper shaft, a hanger having collars for suspending it from said shaft, a lower shaft supported by the hanger by means of collars, said hanger having a central transmission shaft; substantially as described.

12. In a flying machine, the combination of propeller gearing mounted upon the main body portion of the machine, a hanger supported upon a rigid shaft of said main body portion and itself supporting a rigid shaft, a car suspended from the hanger upon the rigid suspending shaft thereof, an upright rigid transmission shaft carried by the hanger and having miter gears at its top and bottom, and idler gears on the two rigid shafts referred to, said idler gears being operatively connected respectively to the propeller and to the motor; substantially as described.

13. In a flying machine, the combination of a car in which the motor mechanism is installed, a rigid hanger from which the car is suspended and which is itself suspended from and below the frame work of the flying machine by means of rigid supports, a propeller, an intermediate gearing extending from the motor to the propeller, the hanger and the car being mounted to swing in directions at right angles to each other; substantially as described.

14. In a flying machine, a main body portion, a car mounted to swing therefrom on transverse and longitudinal axes, a sidewise swinging rudder, and a flexible member connecting said rudder with a point on the car immediately adjacent the transverse axis; substantially as described.

15. In a flying-machine, the combination with the main body portion, of a rigid fore and aft swinging hanger supported rigidly therefrom, a sidewise swinging car or carrier frame supported from the hanger, a horizontal rudder for directing the vertical course of the flying-machine, and connections by means of cords or wires and blocks or sheaves from said rudder to an arm fixed to the side and lower part of the hanger, so that the fore and aft swing of the hanger will automatically swing the rudder up or down as the case may be to reëstablish equilibrium; substantially as described.

16. In a flying-machine, the combination with the main body portion, of a fore and aft swinging hanger suspended therefrom, a sidewise swinging car or carrier frame supported from the hanger, a vertical rudder for directing the horizontal course of the flying-machine, and a cord extending from said rudder to the upper part of the car frame, so that a side dip or inclination of the flying-machine will automatically swing the rudder over to the side of the lower wing; substantially as described.

17. In a flying machine, the combination of a main body portion, a car freely suspended therefrom, a vertically swinging rudder, an automatically operated connection between the rudder and car to compensate for the vertical deflection of the machine, and a cord connected at its ends with the fore and aft parts of the body portion and by which the automatic connection can be actuated at the will of the operator to change in a vertical plane the direction of flight; substantially as described.

18. In a flying machine, the combination of a main body portion, a car freely suspended therefrom, a horizontally swinging rudder, an automatically operated connection between the rudder and car, and a cord connected at its ends with points at opposite sides of the body portion whereby either side may be depressed at the will of the operator in order to change the direction of flight in a horizontal plane; substantially as described.

19. An aeroplane comprising a gliding structure and a pendant structure secured thereto by pivotal connections having an axis approximately parallel with the direction of flight, a motor in said pendant structure, a horizontal propelling shaft in said gliding structure, and transmission gearing between said motor and said propelling shaft.

20. An aeroplane comprising a gliding structure and a pendant structure secured thereto by a universal joint, a motor in said pendant structure, a horizontal propelling shaft in said gliding structure, and transmission gearing between said motor and said propelling shaft.

In testimony whereof I hereunto affix my signature in presence of two witnesses.

FREDERICK WILLIAM DUFWA.

Witnesses:
W. THOMPSON,
G. A. GUERRA.

Copies of this patent may be obtained for five cents each, by addressing the "Commissioner of Patents, Washington, D. C."